UNITED STATES PATENT OFFICE.

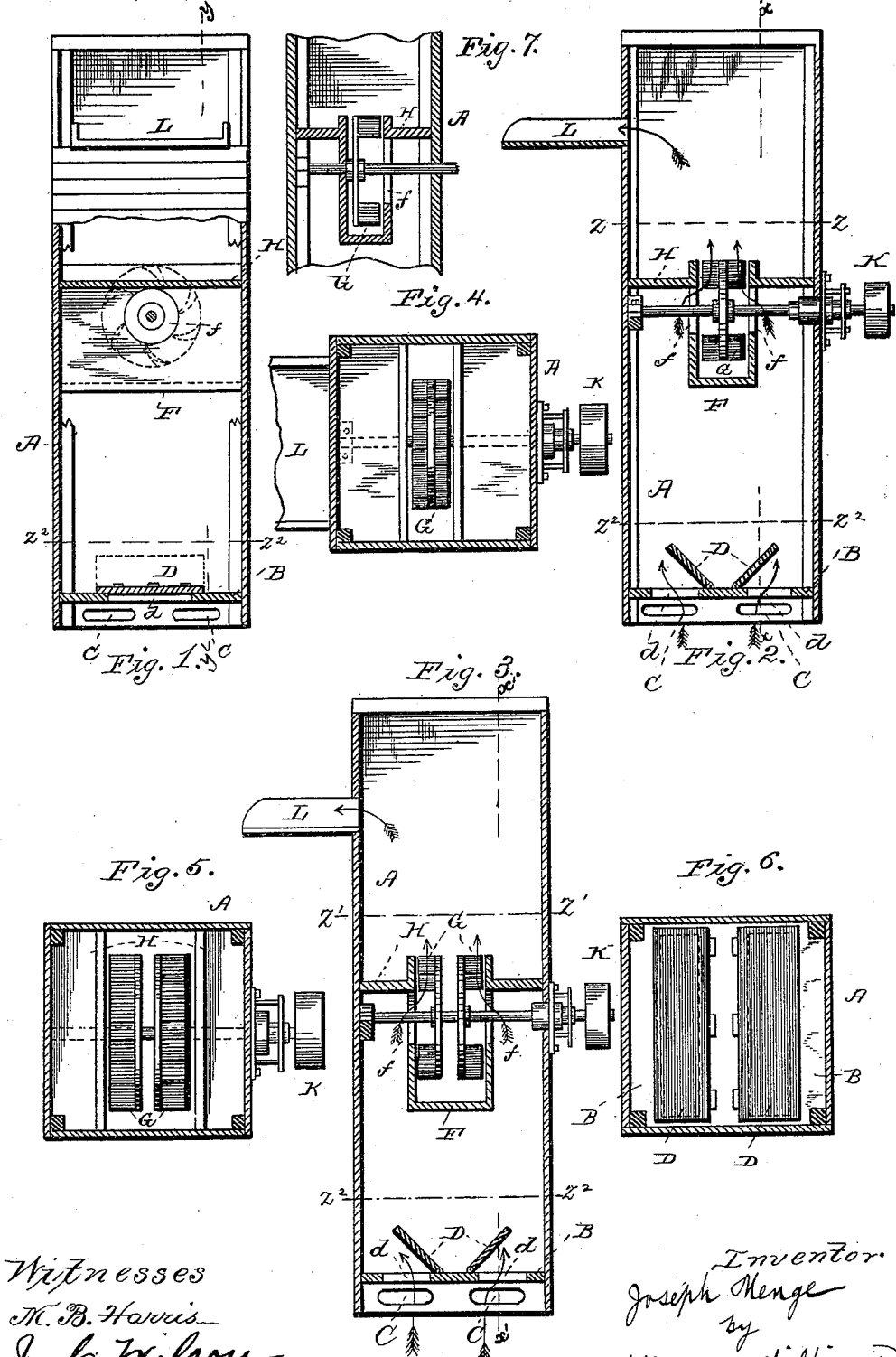

JOSEPH MENGE, OF NEW ORLEANS, LOUISIANA.

ROTARY PUMP.

SPECIFICATION forming part of Letters Patent No. 471,486, dated March 22, 1892.

Application filed May 8, 1891. Serial No. 392,123. (No model.)

*To all whom it may concern:*

Be it known that I, JOSEPH MENGE, a citizen of the United States, residing at New Orleans, in the parish of Orleans and State of Louisiana, have invented certain new and useful Improvements in Rotary Pumps; and I do hereby declare the following to be a full, clear, and exact description of the invention, such as will enable others skilled in the art to which it appertains to make and use the same.

My present invention relates to improvements in rotary pumps; and it consists of certain improvements upon the general form of pump described in my patent, No. 421,415, dated February 18, 1890, and reissued December 29, 1891, No. 11,214.

While the form of pump herein shown is specially adapted for purposes of drainage and irrigation it will readily be seen that the same device with or without unimportant modifications may be adapted to many of the various uses for which pumps are now employed.

Reference is had to the accompanying drawings, wherein the same parts are indicated by the same letters.

Figure 1 represents a vertical section of the box or casing for either of the pumps shown in Figs. 2 and 3, the said Fig. 1 being a section along the line $x\ x$ of Fig. 2 and $x'\ x'$ of Fig. 3, in both cases looking to the left. Fig. 2 represents a vertical section of one form of pump along the line $y\ y$ of Fig. 1, parts being broken away and some of the pump-blades not being shown. Fig. 3 represents a similar vertical section of a modified form of pump, some of the pump-blades not being shown. Fig. 4 shows a horizontal section of the pump-box along the line $z\ z$ of Fig. 2. Fig. 5 represents a horizontal section of the pump-box along the line $z'\ z'$ of Fig. 3. Fig. 6 represents a horizontal section of the pump-box along the line $z^2\ z^2$ of Figs. 1, 2, and 3. Fig. 7 shows a modification of my device wherein an unbalanced wheel is used.

A represents the box or casing for the pump, preferably a rectangular wooden box, made with four corner timbers and water-tight sides and having the bottom B raised somewhat from the end of the box with holes C in the sides of the box for the admission of water when the lower end rests in the mud or on any solid foundation. The lower end of the box is to be set in the water which should stand on the outside of the box higher than the bottom B. Rectangular holes $b$ cut in the bottom B are normally kept covered by the valves D, hinged at one side and lifting upward as the water is sucked in.

Running across the box A is a small box F, in which the wheel revolves. This box has a closed bottom but has no top, and cut in its sides are two circular apertures each equal in diameter to the distance across the wheel between opposite cutting edges of the blades.

G is the wheel. This is shown in Fig. 2 as composed of a central disk with blades or vanes mounted on either side thereof and at a uniform distance from the center.

In Fig. 3, instead of having one disk with blades on either side thereof, two disks are shown, and the wheel is said to be "split." The advantage of having blades on both sides of the disk or two disks with blades obversely mounted thereon is to get the effect of balanced suction.

The particular form of wheel preferred by me is shown in the drawings hereunto annexed, and is fully described in my application, Serial No. 390,028, filed April 22, 1891; but I may use two right and left hand disk-wheels, (shown in Fig. 3,) whereby the box can be made larger and a larger delivery obtained. The said disk-wheel (or wheels) is keyed on a shaft journaled in the sides of the box A and driven by the pulley K. The box F protrudes somewhat above the shelf or false bottom H, which with the said box F forms the partition between the lower or suction compartment of the pump-box A, the only communication between the two compartments being through the suction-ports $f$. The object of the shelf or false bottom H is to divide the box and obtain a suction through the ports $f\ f'$.

L is the delivery or overflow chute. Its height above the wheel should be regulated by the height to which the water is to be raised.

The top of the box A may be open or closed.

In order to start the pump, it will have to be "primed"—that is, filled with water up to the top of the suction-ports $f$. While this is being done, the valves D will remain closed by their own weight and the pressure of the water from above. When the suction compartment of the box A is filled above the ports $f$ and the wheel begins to revolve, the suction will be sufficient to lift the ports and water is sucked in through the holes C and $b$, (the box A is supposed to be standing in the water,) and then through the ports $f$ to the box F, whence it is thrown by the wheel up into the discharge-compartment, and after rising high enough in the discharge-compartment flows off through the chute L. The advantages of this construction are more than sufficient to compensate for the necessity of "priming." Thus the pressure on both sides of the wheel or wheels is the same and there is no tendency to irregularity in wear or performance due to inequalities in pressure. Again, by having the shaft horizontal and all the gear entirely above water when not in use, the parts may be easily examined and repaired. Again, this leaving passages between the blades open axially as well as radially and placing the cutting-blades near the periphery where they do the most work, both greatly diminish friction and tend to economy in the operation of the pump.

Having thus described my invention, what I claim, and desire to secure by Letters Patent of the United States, is—

1. In a rotary pump, the combination, with a box or casing having apertures in the bottom for the admission of water, of a shelf or floor separating the said casing into two compartments, a box let into said shelf or floor having a closed bottom and open top with parallel sides and a suction-port in each of said sides, and a wheel or wheels having right-hand blades revolving in front of one of said apertures and left-hand blades revolving in front of the other of said apertures, substantially as described.

2. In a rotary pump, the combination, with a box or casing having apertures in the bottom for the admission of water, of a shelf or floor separating the said casing into two compartments, a box let into said shelf or floor having a closed bottom and open top with parallel sides and a suction-port in each of said sides, a shaft passing through said box concentric with said apertures, a wheel mounted on said shaft and having right-hand blades on the face of a disk revolving in front of one of said apertures, and a wheel also mounted on said shaft and having left-hand blades on the face of a disk revolving in front of the other of said apertures, substantially as described.

In testimony whereof I affix my signature in presence of two witnesses.

JOSEPH MENGE.

Witnesses:
JNO. J. WARD,
CHAS. M. HERD.